United States Patent [19]

Shibata et al.

[11] Patent Number: 5,594,878

[45] Date of Patent: Jan. 14, 1997

[54] BUS INTERFACE STRUCTURE AND SYSTEM FOR CONTROLLING THE BUS INTERFACE STRUCTURE

[75] Inventors: Yuji Shibata; Makoto Okazaki; Hisamitsu Tanihira, all of Kawasaki; Katsuyuki Okada, Tokorozawa, all of Japan

[73] Assignee: Fujitsu Limited, Kanagawa, Japan

[21] Appl. No.: 392,604

[22] Filed: Feb. 22, 1995

Related U.S. Application Data

[63] Continuation of Ser. No. 84,085, Jun. 28, 1993, abandoned, which is a continuation of Ser. No. 629,726, Dec. 18, 1990, abandoned.

[30] Foreign Application Priority Data

Dec. 18, 1989 [JP] Japan ................................. 1-328040

[51] Int. Cl.$^6$ ..................................................... G06F 13/28
[52] U.S. Cl. ........................... 395/309; 395/250; 395/853; 364/239; 364/DIG. 1
[58] Field of Search ........................ 395/800, 275, 395/425, 250, 853, 309; 364/239, DIG. 1

[56] References Cited

U.S. PATENT DOCUMENTS

| | | |
|---|---|---|
| 4,644,463 | 2/1987 | Hotchkin et al. ................. 364/200 |
| 4,839,801 | 6/1989 | Nicely et al. ..................... 395/275 |
| 4,959,777 | 9/1990 | Holman, Jr. ...................... 395/325 |
| 5,025,366 | 6/1991 | Baror ............................... 395/425 |
| 5,097,409 | 3/1992 | Schwartz et al. ................. 395/425 |
| 5,249,279 | 9/1993 | Schmenk et al. ................. 395/425 |
| 5,255,378 | 10/1993 | Crawford et al. ................. 395/325 |

Primary Examiner—Alyssa H. Bowler
Assistant Examiner—John Harrity

[57] ABSTRACT

A bus interface system has a bus interface, a common memory, a local bus, and a memory controller for use in a memory control. The memory controller has a buffer and is connected to the local bus. The bus interface has a burst disassembling control circuit which disassembles burst transfer data into one or a plurality of block transfers and one or a plurality of one-word transfers, which are supplied to the memory controller so that when the bus interface receives all requested data received from the common memory during a read access, the bus interface adds information on a destination device, connected to a system bus, to all the requested data and sends all the requested data with that information to the destination device via the system bus.

5 Claims, 10 Drawing Sheets

| DEC | | | A30:31 | | | | |
|---|---|---|---|---|---|---|---|
| | | | 0 | 1 | 2 | 3 | |
| BLOCK =0 | B0:7 | 0 | / | / | / | / | =1 |
| | | 1 | BEN0=1<br>1=0<br>2=0<br>3=0<br>BYT=1 | 0<br>1<br>0<br>0<br>1 | 0<br>0<br>1<br>0<br>1 | 0<br>0<br>0<br>1<br>1 | =0 |
| | | 2 | BEN0=1<br>1=1<br>2=0<br>3=0<br>BYT=2 | 0<br>1<br>1<br>0<br>2 | 0<br>0<br>1<br>1<br>2 | 0<br>0<br>0<br>1<br>1 | =0 |
| | | 3 | BEN0=1<br>1=1<br>2=1<br>3=0<br>BYT=3 | 0<br>1<br>1<br>1<br>3 | 0<br>0<br>1<br>1<br>2 | 0<br>0<br>0<br>1<br>1 | =0 |
| | | 4 | BEN0=1<br>1=1<br>2=1<br>3=1<br>BYT=4 | 0<br>1<br>1<br>1<br>3 | 0<br>0<br>1<br>1<br>2 | 0<br>0<br>0<br>1<br>1 | =0 |
| BLOCK =1 | B0:7 | 16 | BEN0=1<br>1=1<br>2=1<br>3=1<br>BYT=16 | | | | =0 |

FIG.10

BUS INTERFACE STRUCTURE AND SYSTEM FOR CONTROLLING THE BUS INTERFACE STRUCTURE

This is a continuation of application Ser. No. 08/084,085, filed Jun. 28, 1993, now abandoned, which is a continuation of application Ser. No. 07/629,726 filed Dec. 18, 1990, now abandoned.

BACKGROUND OF THE INVENTION

The present invention relates to a bus interface control system and apparatus for a data transfer in a multiprocessor system in which a plurality of MPUs, a plurality of IOCs and a common memory are connected to a system bus.

Generally, in a computer system having two different buses, it is necessary to provide a bus interface between the two buses. For example, in a multiprocessor system, a plurality of microprocessors (MPUs), a memory and an input/output unit (I/O unit) which are resources in common for the MPUs have first buses. The first buses are mutually connected via a second bus provided in common for the above elements. Normally, the first buses are called local buses, and the second bus is called a system bus. Bus interfaces are provided for the respective local buses, and connect the respective local buses to the system bus.

In order to improve the system performance in recent computer systems, the amount of information (address and a series of data) in a once transfer sequence tends to be increased in recent computer systems.

Figure 1:
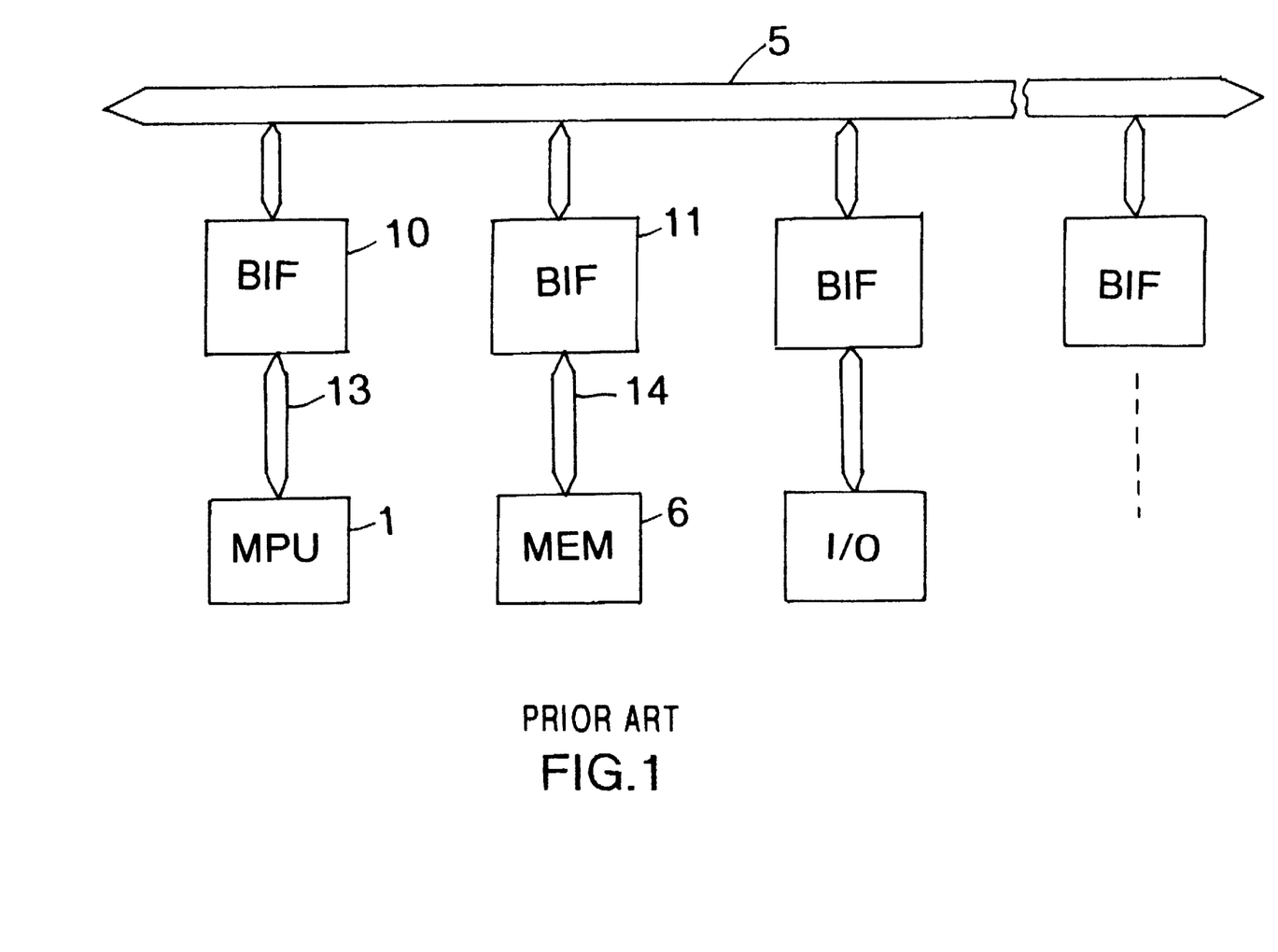
FIG. 1 is a block diagram of the outline of a system to which the present invention can be applied.

FIG. 1 is a diagram showing the outline of a system to which the present invention can be applied. A computer system shown in FIG. 1 has a plurality of first buses (local buses) 13 and 14, and a second bus 5 (system bus). These buses are provided for transferring information. An MPU 1 is connected to the first bus 13, and a memory (MEM) 6 is connected to the first bus 14. Similarly, other elements are connected to the first buses.

The first bus 13 and the second bus 5 are mutually connected via a bus interface (BIF) 10, and the second bus 14 and the second bus 5 are mutually connected via a bus interface (BIF) 11.

Figure 2:
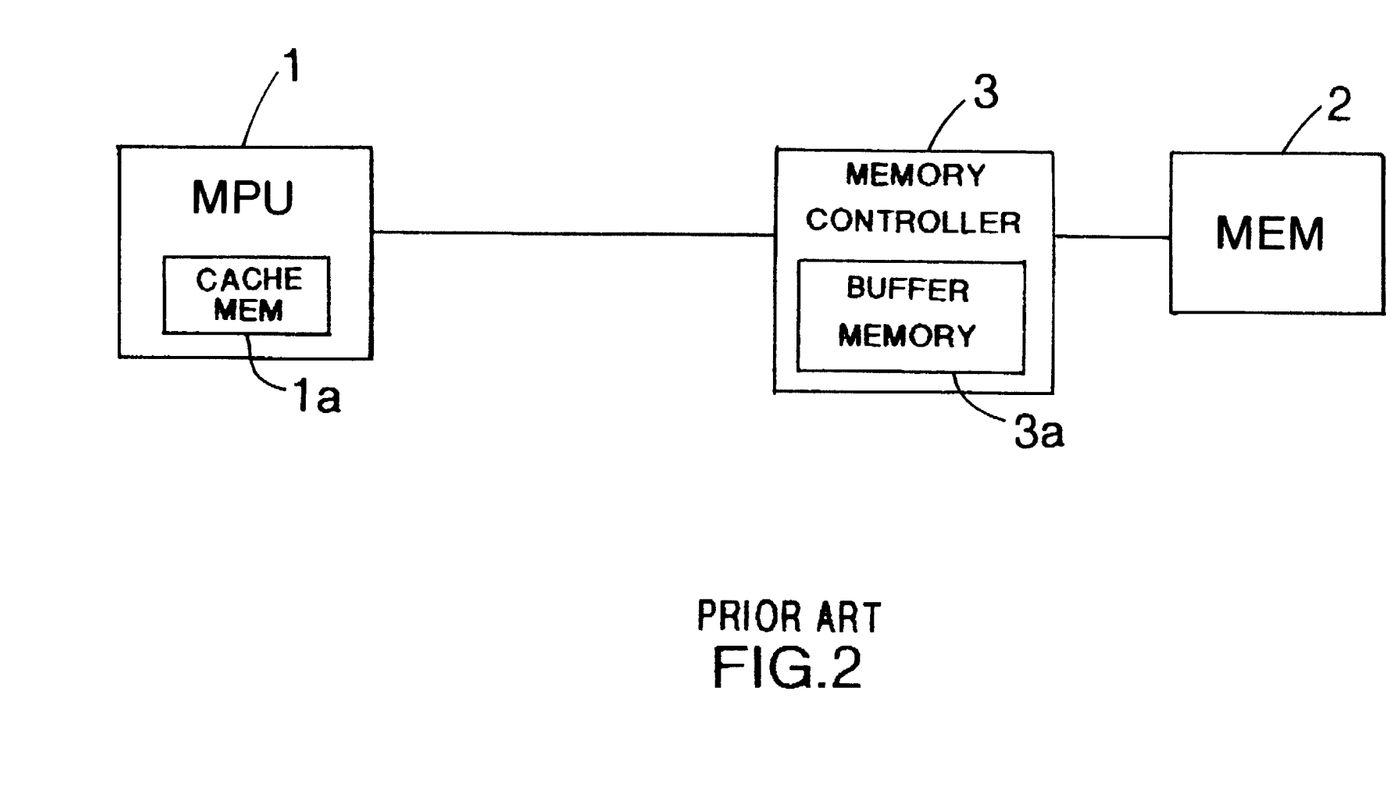
FIG. 2 is a diagram illustrating a procedure of a data transfer between an MPU and a memory.

In a case where data is transferred between the MPU and the memory, a memory controller is disposed between the MPU and the memory. The memory controller serves as an interface between the MPU and the memory. FIG. 2 shows a data transfer which is carried out between the MPU and the memory. Normally, a cache memory 1a is built in the MPU 1 in order to compensate for a low-speed operation of the memory 2. In order to store data read out from the memory 2, it is necessary to provide a memory controller 3 with a buffer memory 3a having a capacity necessary for a replacement control to the cache memory 1a.

The MPU 1 having the cache memory (hereinafter referred to as a buffer) 1a carries out a block transfer to replace the contents of the buffer 1a. The unit of the block transfer is 4 W (16 bytes), assuming that one word (W) is equal to 4 bytes. The memory controller 3 has a 16-byte buffer to realize the block transfer, and sequentially sends data necessary for an initial stage of the block transfer to the MPU 1.

Figure 3:
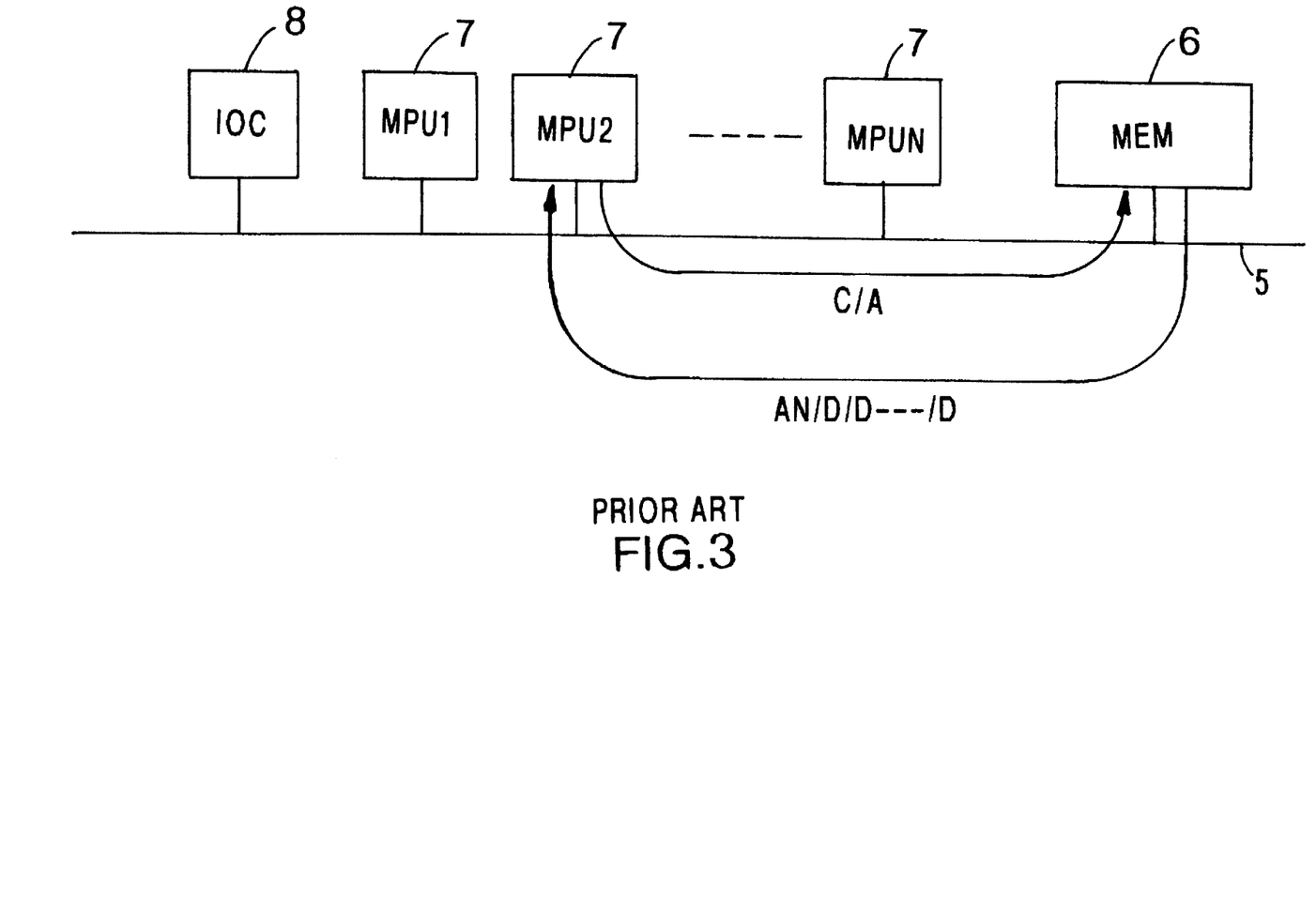
FIG. 3 is a diagram illustrating a configuration of a multiprocessor system.

Generally, in a multiprocessor system as shown in FIG. 3, a common memory 6, a plurality of MPUs 7 and an IOC (input/output control unit) 8 are connected to the system bus 5. The data processing ability of the entire system is limited by the throughput of the system bus 5. In order to improve the throughput, a synchronous type time split method is employed. In a conventional synchronous type time split method, information is transferred in synchronism with a clock, and an interface between a request and an answer is split on the time base. A large storage capacity buffer is provided for a bus interface (BIF) in order to accomplish such a synchronous type time slit method. By using the above synchronous type time split method, it is possible to use idle portions for an arbitrary purpose.

Turning now to FIG. 3, the MPU 7 transfers a read command C and an address A to the common memory 6, which returns read data D, D, D, . . . to the MPU 7 together with an answer AN. The read command C includes information indicative of the number of bytes of data requested to be transferred, and information representative of the read request.

Figure 4:
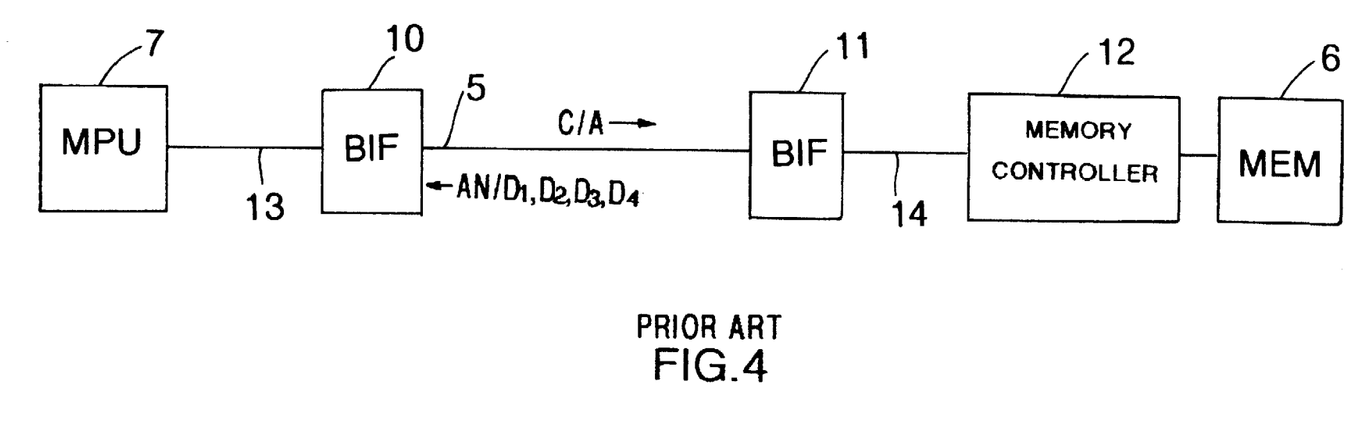
FIG. 4 is a diagram for explaining an MPU access.

A description will now be given of an MPU accessing procedure and an IOC accessing procedure in conventional multiprocessor systems with reference to FIG. 4, in which those parts which are the same as those shown in FIG. 3 are given the same reference numerals. A local bus 13 is provided between the MPU 7 and a bus interface 10. The system bus 5 is provided between the bus interface 10 and the bus interface 11. A local bus 14 is provided between the bus interface 11 and a memory controller 12. The memory controller 12 is connected to the common memory 6.

In response to a block transfer request which is output by the MPU 7 and received by the bus interface 10 via the local bus 13, the bus interface 10 sends the read command C and the address A of the common memory 6 to the bus interface via the system bus 5. The bus interface 11 transfers the block transfer request from the MPU 7 to the memory controller 12 via the local bus 14.

The memory controller 12 reads out data amounting to one block (4 W; four words) from a storage area of the common memory 6 designated by the address A, and temporarily stores the readout data in an internal buffer having a storage capacity equal to 4 W. After that, the memory controller 12 sends the one-block data to the bus interface 11 via the local bus 14. The bus interface 11 transfers the answer AN and data D1–D4 amounting to 4 W to the bus interface 10 via the system bus 5. The MPU 7 receives the data D1–D4 amounting to 4 W output from the bus interface 10 via the local bus 13, and stores the received data in a cache memory (not shown) provided therein.

Figure 5:
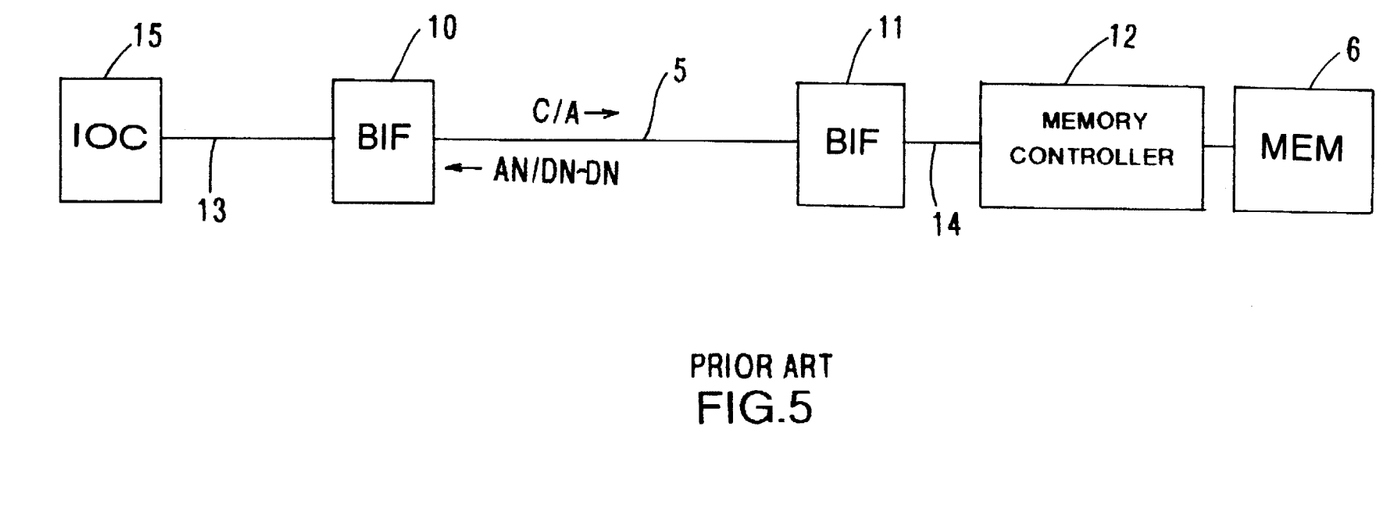
FIG. 5 is a diagram for explaining an IOC access.

FIG. 5 is a diagram illustrating the IOC accessing procedure. In FIG. 5, those parts which are the same as those shown in FIG. 4 are given the same reference numerals. In the IOC accessing procedure, a burst transfer of data is carried out instead of the block transfer. The burst transfer is capable of transferring a large amount of data at one time, so that an efficient data transmission can be realized.

In response to a burst transfer request which is generated and output by the IOC 15 and received by the bus interface 10 via the local bus 13, the bus interface 10 sends the read command C and the address A of the common memory 6 to the bus interface 11 via the system bus 5. The bus interface 11 transfers the burst transfer request from the IOC 15 to the memory controller 12 via the local bus 14.

The memory controller 12 successively reads out data from a storage area of the common memory 6 designated by the address A, and temporarily stores the readout data in an internal buffer memory (having a storage capacity equal to NW). Then, the memory controller 12 sends the readout data to the bus interface 11 via the local bus 14. The bus interface 11 sends the answer An and data D1–DN amounting to NW to the bus interface 10 via the system bus 5. The IOC 15 receives the data via the bus interface 10, and successively stores the internal memory (not shown), and successively carries out a predetermined data processing.

As has been described previously, the memory controller 12 has the internal buffer amounting to 4 W for use in the block transfer, and realizes the high-speed data transfer. Further, in order to realize the burst transfer using the IOC 15, the memory controller 12 needs the internal buffer amounting to NW used for converting the bit rate. This leads to an increase in the amount of hardware of the memory controller 12. In some cases, the bit rate of the block transfer is sacrified. Generally, in many cases, the common memory 6 is accessed by the MPU, and is not frequently accessed by the IOC. It is not efficient to provide for the internal buffer amounting to NW in the memory controller in order to realize a little frequency of accessing by the IOC.

SUMMARY OF THE INVENTION

It is a general object of the present invention to provide a novel and useful bus interface structure and a system using such a bus interface structure in which the aforementioned disadvantages are eliminated.

This object of the present invention is achieved by a bus interface structure comprising:

a bus interface having a first end connected to a system bus, and a second end;

a local bus connected to the second end of the bus interface;

a memory controller having a buffer necessary for a once block transfer and connected to the local bus; and a common memory connected to the memory controller, the bus interface comprising a burst disassembling control circuit which disassembles burst transfer data into one or a plurality of block transfers and one or a plurality of one-word transfers, which are supplied to the memory controller, so that when the bus interface receives all requested data received from the common memory during a read access, the bus interface adds information on a destination device connected to the system bus to all the requested data and sends all the requested data with the information to the destination device via the system bus.

According to the present invention, it is possible to execute a control in which a burst transfer is realized by using a memory built in the memory controller having a capacity necessary for a block transfer.

Another object of the present invention is to provide a bus interface structure in which the burst disassembling control circuit which generates one or a plurality of transfers from a burst transfer command, each of the transfers sending data equal to or less than one word.

According to the present invention, it is possible to carry out an appropriate control even when a starting address or end address of the burst transfer command does not form a boundary between two consecutive words.

Yet another object of the present invention is to provide a bus interface control system comprising:

a bus interface having a first end connected to a system bus, and a second end;

a local bus connected to the second end of the bus interface;

a memory controller having a buffer necessary for a once block transfer and connected to the local bus; and a common memory connected to the memory controller, the memory controller comprising a buffer having a capacity necessary for one block transfer, the bus interface comprising a burst disassembling control circuit which disassembles burst transfer data into one or a plurality of block transfers and one or a plurality of one-word transfers, which are supplied to the memory controller, so that when the bus interface receives all requested data received from the common memory during a read access, the bus interface adds information on a destination device connected to the system bus to all the requested data and sends all the requested data with the information to the destination device via the system bus.

According to the present invention, it is possible to realize a burst transfer using a memory built in the memory controller having a capacity necessary for a block transfer.

A further object of the present invention is to provide a bus interface control system in which one or a plurality of transfers is generated from a burst transfer command, each transfer sending data equal to or less than one word.

BRIEF DESCRIPTION OF THE DRAWINGS

Other objects and features of the present invention will become more apparent from the following description when read in conjunction with the accompanying drawings, in which.

DESCRIPTION OF THE PREFERRED EMBODIMENT

Figure 6:
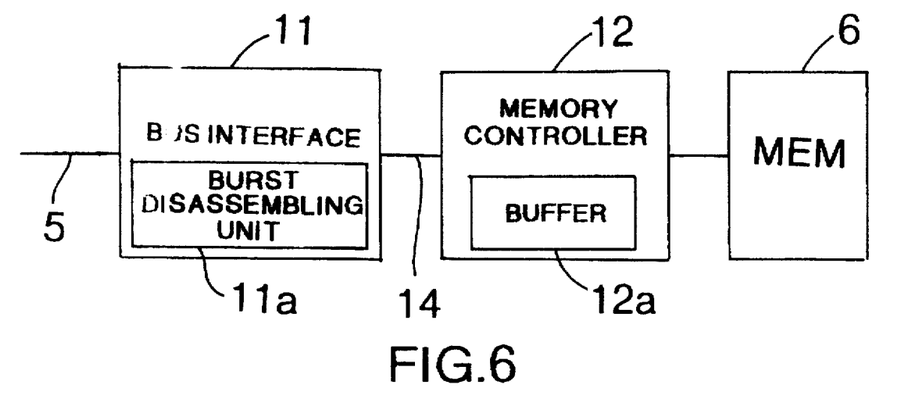
FIG. 6 is a block diagram illustrating the principle of the present invention.

FIG. 6 is a block diagram illustrating the principle of the present invention. A bus interface shown in FIG. 6 has the aforementioned system bus 5, the bus interface 11 having one end connected to the system bus 5, the local bus 14 connected to the other end of the bus interface 11, the memory controller 12 which is connected to the local bus 14 and which controls the common memory 6, and the common memory 6 connected to the memory controller 12. The memory controller 12 has a buffer 12a having a capacity enough to carry out a block transfer control. The bus interface 11 has a burst disassembling circuit 11a built therein. The burst disassembling control circuit 11a disassembles a burst transfer command into one or a plurality of block transfers and one or a plurality of individual transfers, each individual transfer sending data equal to or less than one word.

With respect to a burst transfer request from the IOC, the burst disassembling control circuit 11a generates one or more block transfers and one or more individual transfers transferring data from a burst transfer command, each individual transfer sending data equal to or less than one word. The memory controller 12 operates to realize one or more block transfers and one or more individual transfers instructed by the burst disassembling control circuit 11a. Thus, the memory controller 12 can process the burst transfer in the same way as the block transfer. When the bus interface 11 has received all requested data read out from the common memory 6, the bus interface 11 adds, to the entire readout data, information indicative of a destination to which all the data is to be transferred.

Figure 7:
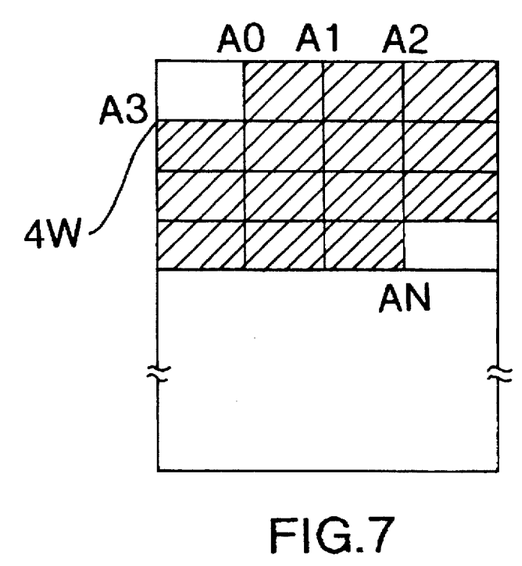
FIG. 7 is a diagram for explaining the operation of the present invention.

Referring to FIG. 7, assuming that the common memory 6 has burst transfer areas which are hatched and which have respective addresses AO through AN, the bus interface 11 reads a transfer starting address from a burst transfer command supplied from the IOC, and determines whether or not the transfer starting address forms a 4 W boundary. In the case shown in FIG. 7, the address AO does not form the 4 W boundary, and the first three pieces of data are transferred by the individual transfer procedure (in which data equal to or less than one word is transferred for every individual transfer). The address A4 forms the 4 W boundary, and thus the block transfer is carried out. The address AN of the last area in the row obtained immediately after the first two block transfers are completed does not form the 4 W transfer. Thus, data in the three consecutive areas including the last area having the address AN are transferred by the individual transfer procedure.

With the above-mentioned arrangement, it is sufficient to provide the buffer 12a built in the memory controller 12 with a capacity necessary for once block transfer.

Figure 8:
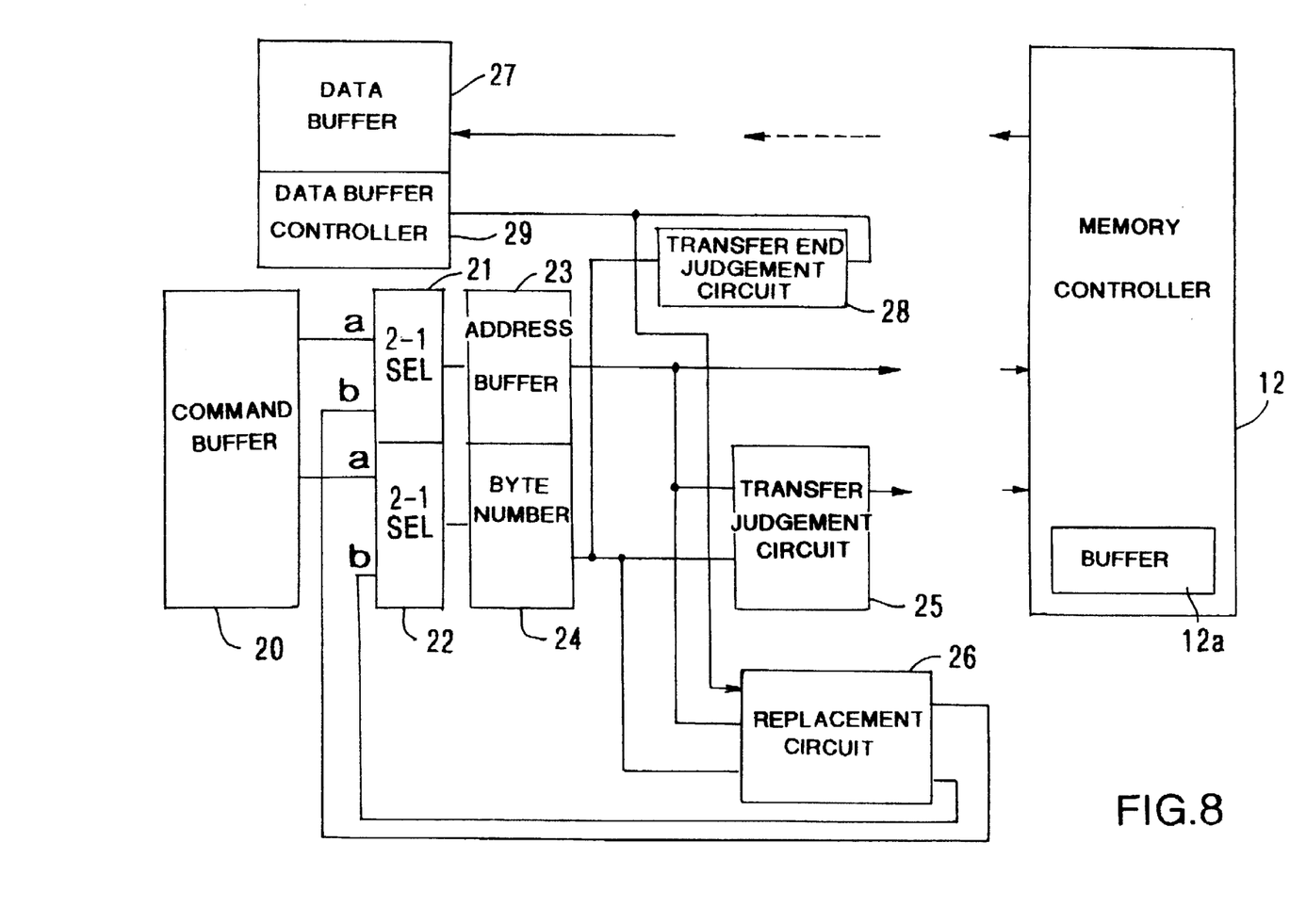
FIG. 8 is a diagram illustrating the structure of a bus interface used in the present invention.

FIG. 8 shows an example of the configuration of the bus interface used in the present invention in detail. A command carried on the system bus 5 is received by a command buffer 20. The command stored in the command buffer 20 is analyzed, and recognized to be, for example, a read command. The starting address data stored in the command buffer 20 and the number of data (in byte unit) stored therein are written into an address buffer 23 and a byte number buffer 24 via 2-1 selectors 21 and 22, respectively. The address of data written into the address buffer 23 is provided in the byte unit. At this time, each of the 2-1 selectors 21 and 22 selects input a. Thus, the output of the command buffer 20 is written into the address buffer 23 and the byte number buffer 24.

A one-word transfer/block transfer judgment circuit 25 (which corresponds to the burst disassembling control circuit 11a shown in FIG. 6) judges, by referring to the contents of the address buffer 23 and the byte number buffer 24, whether the individual transfer or the block transfer should be carried out. When it is determined that the individual transfer should be carried out, the one word transfer/block transfer judgment circuit 25 outputs a control signal indicative of the individual transfer to an address line in the local bus. In response to the control signal, the memory controller 12 causes a data buffer 27 to hold data read out from the common memory 6 via the local bus data line 14.

When the above-mentioned data transfer is carried out, an address buffer/byte number buffer replacement circuit 26 replaces the contents of the address buffer 23 and the byte number buffer 24. Then, the output of the address buffer/byte number buffer replacement circuit 26 is written into the address buffer 23 and the byte number buffer 24.

Next, the one word transfer/block transfer judgment circuit 25 judges, by referring to the replaced contents of the address buffer 23 and the byte number buffer 24, whether or not a condition to carry out the block transfer (that is, first, the address indicates the 4 W boundary, and second, the number of bytes of the remaining data is equal to or larger than 4 W) is satisfied. When it is judged that the above-mentioned condition is satisfied, the one word transfer/block transfer judgment circuit 25 instructs, via a local bus block line, the memory controller 12 to carry out the block transfer. As a result, the memory controller 12 reads out data amounting to 4 W from the common memory 6, and causes the data buffer 27 to store the above data.

During a time when the above-mentioned data transfer is repeatedly being carried out, a transfer end judgment circuit 28 counts the number of bytes of the remaining data by down counting. When the transfer end judgment circuit 28 shows that there is no remaining data, it informs a data buffer controller 29 of the end of data transfer. When data buffer controller 29 is informed of the end of data transfer, it starts to transfer data amounting to NW stored in the data buffer 27 toward the IOC. More specifically, the data buffer controller 29 outputs data to the system bus 5.

Figure 9:
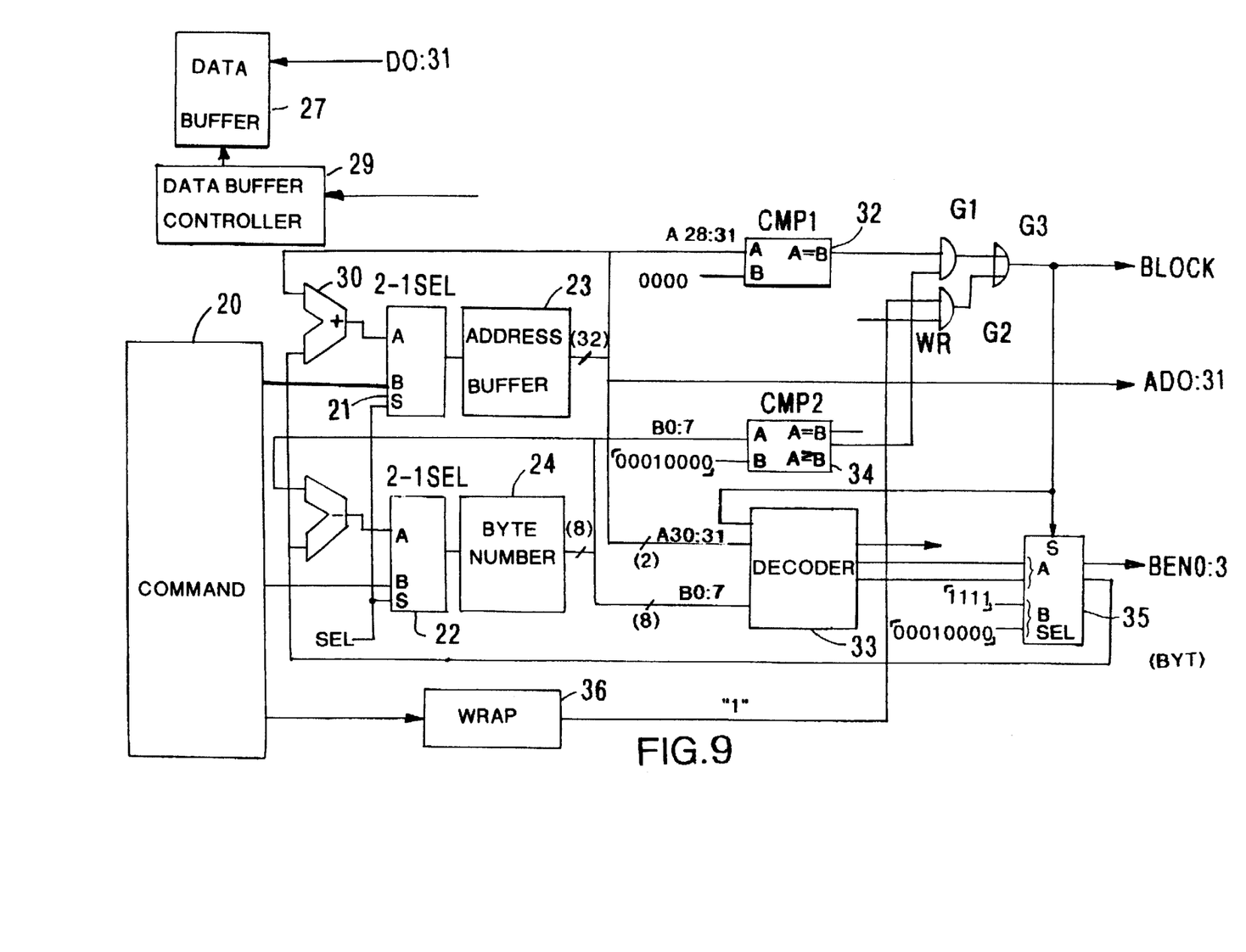
FIG. 9 is a block diagram illustrating the structure of the bus interface in more detail.

FIG. 9 shows the structure of the bus interface in more detail. In FIG. 9, those parts which are the same as those shown in FIG. 8 are given the same reference numerals. The bus interface shown in FIG. 9 has an adder 30 for use in replacement of the address buffer 23, and a subtracter 31 for calculating the number of bytes of the remaining data in the byte number buffer. The adder 30 and the subtracter 31 configure the address buffer/byte number buffer replacement circuit 26 shown in FIG. 8.

The output of the adder 30 is applied to input A of the 2-1 selector 21, and an initial address value supplied from the command buffer 20 is applied to input B of the 2-1 selector 21. The output of the adder 31 is applied to input A of the 2-1 selector 22, and an initial transfer byte number supplied from the command buffer 20 is applied to input B of the 2-1 selector 22. The outputs of the 2-1 selectors 21 and 22 are input to the address buffers 23 and 24, respectively. A select signal SEL indicating which one of the input A and B should be selected is supplied to each of the selectors 21 and 22. When the select signal SEL is equal to "1", the input A is selected, and the input B is selected when the select signal SEL is equal to "0".

The output (32 bits) of the address buffer 23 is input to the adder 30 which functions as a replacement circuit. Four low-order bits A28–A31 are applied to input A of a first comparator 32 (hereafter referred to as CMP1), and two low-order bits A30 and A31 are input to a decoder 33. The output (8 bits) of the byte number buffer 24 is input to the subtracter 31. The output of the byte number buffer 24 is also input to not only the decoder 33 but also a second comparator 34 (hereafter referred to as CMP2).

Four bits, each equal to zero, are input to input B of the CMP1, and data consisting of eight bits (00010000) is input to input B of the CMP2. When the input A of the CMP1 has a value identical to that applied to the input B thereof, the COMP1 outputs a signal BLK equal to "1". When the input A of the CMP2 has a value identical to that applied to the input B thereof, the CMP2 outputs a signal WR equal to "1". On the other hand, when the input A of the CMP2 has a value larger than that applied to the input B thereof, the CMP2 outputs a signal BOK equal to "1". A wrap instruction buffer 36 receives a wrap instruction signal from the command buffer 20. The decoder 33 outputs a data end signal related to the decoded signal.

The above-mentioned wrap instruction signal indicates the execution of the block transfer in order to replace the contents of the cache 1a. For example, when 1 W starting from address "72" contained in one block (=4 W) starting from address "64" is replaced, 1 W starting from address "72", 1 W starting from address "76", 1 W starting from address "64" and 1 W starting from "68" are transferred in this order. It will be noted that this transfer appears to be the block transfer.

A selector 35 selects either input A or input B and outputs a byte enable signal and a replacement byte number signal indicative of the number of bytes to be replaced. The replacement byte number signal is output to the adder 30 and the subtracter 31.

An AND gate G1 receives the signal BLK output by the CMP1 and the signal BOK output by the CMP2. An AND gate G2 receives the output of the wrap instruction buffer 36 and the signal WR output by the CMP2. An OR gate G3 receives the outputs of the AND gates G1 and G2. The output of the OR gate G3 is output, as a block signal BLOCK, to the local bus. The output of the OR gate G3 is also input, as a select signal, to the aforementioned selector 35, and input, as a control signal, to the decoder 33.

The output of the address buffer 23 consisting of 32 bits A0–A31 is output to the local bus. In response to the select signal SEL, when the block signal BLOCK is equal to "0", the selector 35 selects the input A, and on the other hand, selects the input B when the block signal BLOCK is equal to "1".

Figure 10:
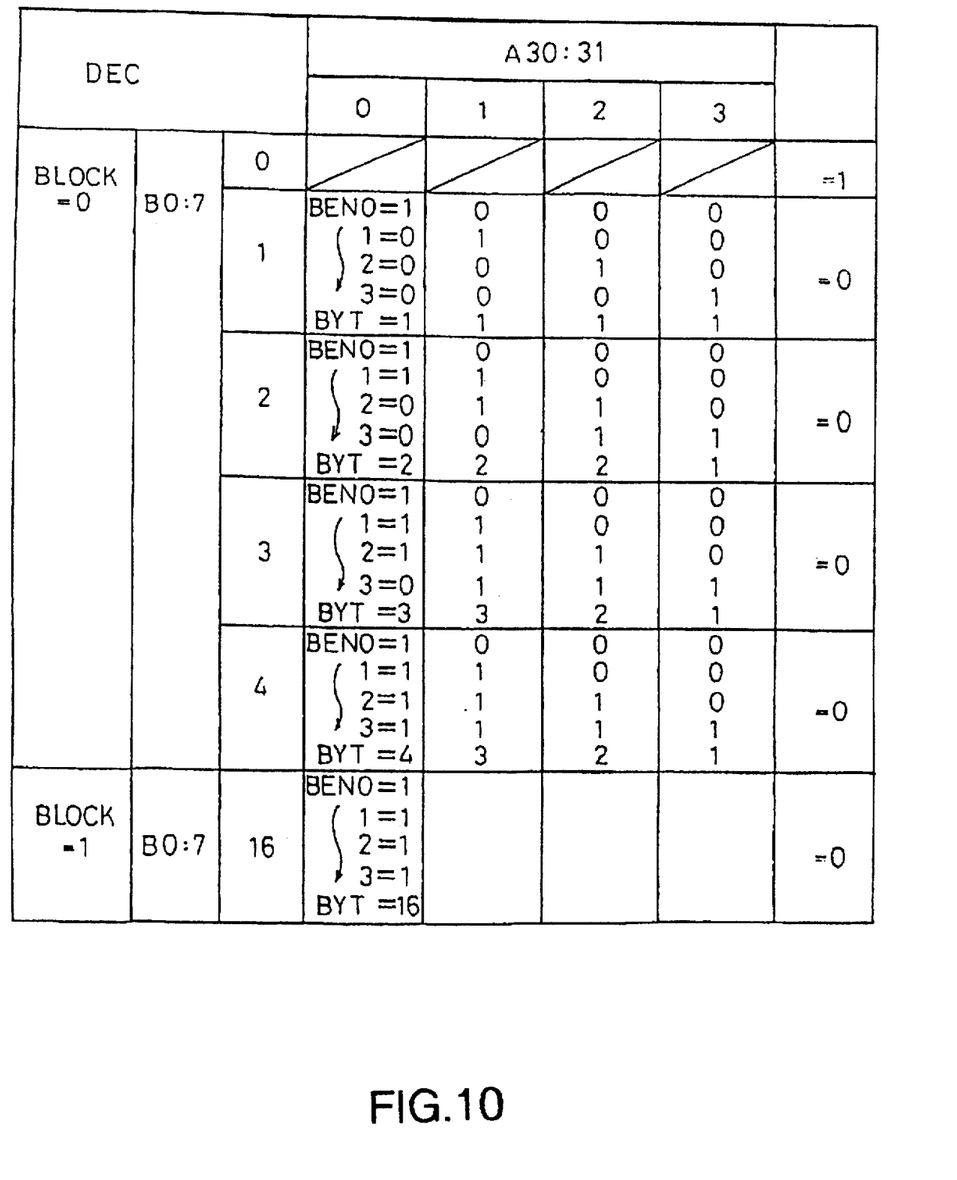
FIG. 10 is a diagram illustrating a byte enable signal and the function of byte number generating circuit.

FIG. 10 shows the function of the decoder 33. A mode obtained when the block signal BLOCK is equal to "1" is different from that obtained when it is equal to "0". The block transfer is not carried out and the individual transfer in the word unit is carried out when the block signal BLOCK is equal to "0". On the other hand, when the block signal BLOCK is equal to "1", the block transfer in the 4 W unit is carried out. FIG. 10 shows 4-bit byte enable signals BEN0–3 and the number of bytes, BYT, output by the decoder 33 with respect to each value when the number of bytes, B0, is 7 and each value of the two low-order bits A30 and A31 of the address.

The circuit configured as described above operates as follows.

Figure 11A:
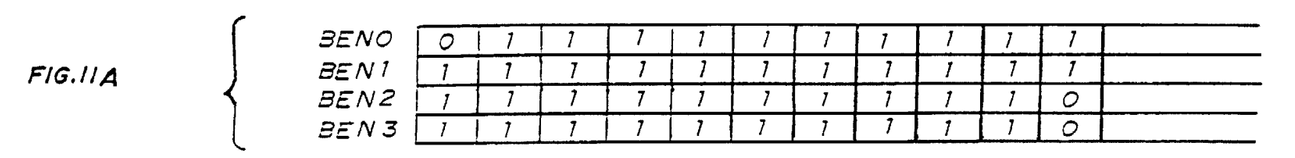
FIGS. 11A–11I are timing charts illustrating the operations of structural parts of the circuit shown in FIG. 9.
Figure 11B:
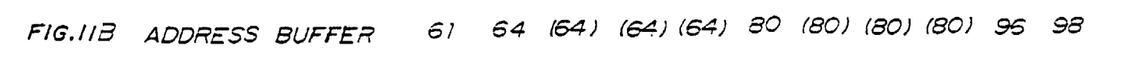
Figure 11C:
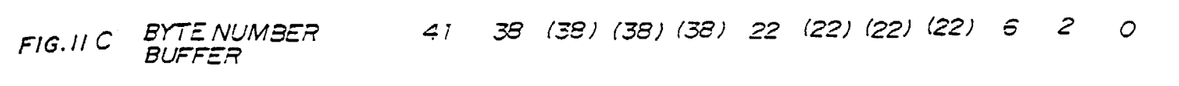
Figure 11D:
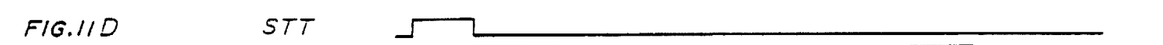

A case is considered where the leading address of the block is "60", and 41 consecutive bytes starting from address "61" are transferred by the burst transfer. FIG. 11 is a timing chart illustrating the operations of parts of the circuit. First, a start signal STT shown in FIG. 11(D) rises. The system starts the data transfer operation in synchronism with the rise of the start signal STT. The leading address "61" and the number of bytes to be transferred, "41", are written into the command buffer 20. As shown in FIG. 11(I), since the select signal SEL is initially equal to "0", the selectors 21 and 22 select the output of the command buffer 20, and "61" and "41" are written into the address buffer 23 and the byte number buffer 24, respectively. The contents of the address buffer 23 become equal to "61" as shown in FIG. 11(B), and the contents of the byte number buffer 24 become equal to "41", as shown in FIG. 11(C).

On the other hand, since the output of the CMP1 is initially equal to "0", the output of the AND gate G1 is "0", and the output of the OR gate G3, namely, the block signal BLOCK is equal to "0". By referring to the value of the block signal BLOCK, it is possible to determine that the individual transfer is requested. In the individual transfer, the select input of the selector 35 is equal to "0", so that the output of the decoder 33 is selected. That is, the replacement byte number BYT is supplied to the adder 30 and the subtracter 31, so that the byte enable signal is obtained as shown in FIG. 11(A). Then, as shown in FIG. 11(G), the individual transfer is carried out. That is, data read out from the common memory 6 passes through the local bus consisting of D0–D31, and is written into the data buffer 27. During the above data transfer, the completion of the individual transfer can be confirmed by a change of a data complete signal DC from "0" to "1" shown in FIG. 11(F). When the individual transfer ends, as shown in FIG. 11(B), a value equal to three bytes is added to the contents of the address buffer 23, so that the contents thereof become equal to "64". On the other hand, a value equal to three bytes is subtracted from the contents of the byte number buffer 24, so that the contents thereof become equal to "38".

During the individual transfer, the four low-order bits A28–A31 are (0000), and the CMP1 outputs the signal equal to "1" which means A=B. The fact that the CMP1 outputs "1" shows that the address being considered forms the 4 W boundary. This signal is input to one input of the AND gate G1. The other input of the AND gate G1 is supplied with the signal BOK indicating that A≧B. Since the current number of bytes is "40", the value obtained at the input A of the CMP2 is greater than that obtained at the input B, that is, 16. Thus, the block signal BOK becomes equal to "1", so that the AND gate G1 is opened. As a result, as shown in FIG. 11(E), the block signal BLOCK output by the OR gate G3 becomes equal to "1", so that the block transfer is permitted.

As a result, the input B of the selector 35 is selected and connected to the adder 30 and the subtracter 31. During the block transfer, data amounting to 4 W (four words) read out from the common memory 6 is stored in the data buffer 27. Until the data transfer (block transfer) of data amounting to 4 W is completed, the contents of the address buffer 23 and the byte number buffer 24 are not changed, as shown in FIG. 11(B) and FIG. 11(C). When the block transfer is completed, a value equal to 16 bytes is added to the contents of the address buffer 23, so that the contents thereof become equal to "80", and a value equal to 16 bytes is subtracted from the content of the byte number buffer 24, so that the contents thereof become equal to "22".

After the 4 W block transfer is completed, the four low-order bits return to (0000), and the output of the CMP1 becomes equal to "1". Regarding the CMP2, since A=22 and B=16, the condition A≧B is satisfied, and the signal BOK is equal to "1". Thus, the block signal BLOCK is equal to "1". As a result, the data amounting to 4 W is read out from the common memory, and stored in the data buffer 27. When the block transfer is completed, the contents of the address buffer 23 are incremented by 16 bytes, so that the address buffer 23 shows "96", and a value equal to 16 bytes is subtracted from the contents of the byte number buffer 24, so that the byte number buffer 24 shows "6".

Figure 11E:
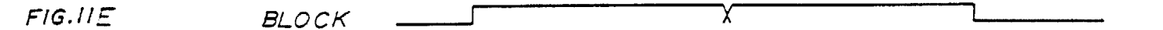
Figure 11F:
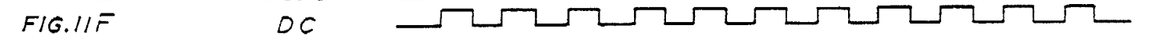
Figure 11G:
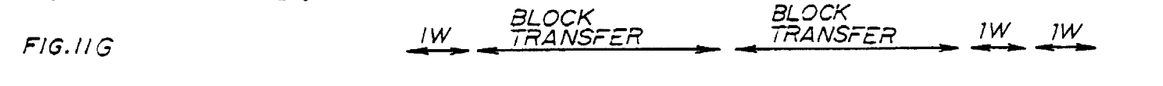
Figures 11H, 11I:
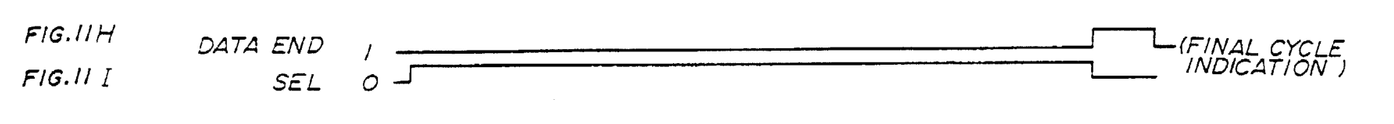

Next, when the output of the CMP1 is equal to "1", the CMP2 does not satisfy the condition A≧B Thus, the block signal BLOCK is changed from "1" to "0", as shown in FIG. 11(E). In response to this change of the block signal BLOCK, the select 35 selects the input A, so that the individual transfer is selected. As shown in FIG. 11(G), when the individual transfer is successively carried out twice, the contents of the byte number buffer 24 become equal to 0, and the decoder 33 outputs the data end signal to the data controller 29. Then, the data controller 29 successively outputs data amounting to 41 bytes stored in the data buffer 27 to the system bus. As shown in FIG. 11(H), the transfer cycle is ended.

Of course, it is possible to apply the bus interface to a conventional block transfer without modifying the bus interface.

According to the present invention, data having a large amount of data which should be transferred by the burst transfer procedure is divided into blocks, each equal to four words, and is transferred by the block transfer procedure. With the above arrangement, it is enough to provide the memory controller with a buffer having a capacity equal to four words, so that a load of the memory controller can be reduced.

In the above description, four words are transferred for every block transfer. However, the present invention is not limited to such a number, and can use an arbitrary number of words. The present invention is not limited to an arrangement in which one word consists of four bytes, and can use one word having an arbitrary number of bytes.

Although the read access is specifically explained above, burst write is carried out in the same way in which block write and individual write are carried out.

What is claimed is:

1. A bus interface structure for a multiprocessor system, the bus interface structure comprising:

a bus interface having a first end connected to a system bus and a second end;

a local bus connected to said second end of said bus interface;

a common memory; and a memory controller for controlling said common memory and being connected at one end thereof to said local bus and at another end thereof to said common memory to transfer data from an MPU of said multiprocessor system to said common memory, said memory controller including a buffer having a capacity for only one block transfer at a time, said memory controller reading out one-word data and block data from said common memory;

said bus interface comprising a burst disassembling control circuit for disassembling burst transfer data into one or a plurality of block data transfers and one or a plurality of one-word data transfers, wherein said first transfer data is disassembled to transfer the burst transfer data by using said buffer having a capacity for only one block transfer at a time, said disassembled burst transfer data being supplied to said memory controller, and said burst disassembling control circuit determining whether a block data transfer or a word data transfer is to be selected in accordance with a transmission starting address of said common memory and the number of words to be transferred.

2. A bus interface as claimed in claim 1, wherein said burst disassembling control circuit generates one or a plurality of transfers from a burst transfer command, each of said transfers sending data equal to one word.

3. A bus interface structure as claimed in claim 1, wherein said bus interface is configured so that when said bus interface receives all requested data received from the common memory during a read access, said bus interface adds information on a destination device connected to said system bus to all the requested data and sends all the requested data with said information to said destination device via said system bus.

4. A bus interface control system for a data transfer in a multiprocessor system, the control system comprising:

a bus interface having a first end connected to a system bus and a second end;

a local bus connected to said second end of said bus interface;

a common memory; and a memory controller including a buffer having a capacity for only one block transfer at a time and being connected at one end thereof to said local bus and at another end thereof to said common memory so as to transfer data from an MPU of said multiprocessor system to said common memory;

said bus interface comprising a burst disassembling control circuit for disassembling burst transfer data into one or a plurality of block transfers and one or a plurality of one-word transfers, wherein said burst transfer data is disassembled to transfer the burst transfer data by using said buffer having a capacity for only one block transfer at a time, said disassembled burst transfer data being supplied to said memory controller so that when said bus interface receives all requested data received from the common memory during a read access, said bus interface adds information on a destination device connected to said system bus to all the requested data and sends all the requested data with said information to said destination device via said system bus.

5. A bus interface control system as claimed in claim 4, wherein said bus interface (11) generates one or a plurality of transfers from a burst transfer command, each of said transfers sending data equal to one word.

* * * * *

UNITED STATES PATENT AND TRADEMARK OFFICE
CERTIFICATE OF CORRECTION

PATENT NO. : 5,594,878
DATED : January 14, 1997
INVENTOR(S) : Yuji SHIBATA et al It is certified that error appears in the above-identified patent and that said Letters Patent is hereby corrected as shown below:

On the title page; item (73) should be corrected as follows:

Assignee: Fujitsu Limited, Kanagawa, Japan
                  Nippon Telegraph and Telephone Corporation, Tokyo, Japan Signed and Sealed this Twenty-ninth Day of July, 1997

Attest:

BRUCE LEHMAN

*Attesting Officer*      *Commissioner of Patents and Trademarks*